United States Patent
Pompey et al.

(10) Patent No.: US 9,355,479 B2
(45) Date of Patent: *May 31, 2016

(54) AUTOMATIC TUNING OF VALUE-SERIES ANALYSIS TASKS BASED ON VISUAL FEEDBACK

(71) Applicant: INTERNATIONAL BUSINESS MACHINES CORPORATION, Armonk, NY (US)

(72) Inventors: Pascal Pompey, Mulhuddart (IE); Olivier Verscheure, Mulhuddart (IE); Michael Wurst, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 432 days.

This patent is subject to a terminal disclaimer.

(21) Appl. No.: 13/685,301

(22) Filed: Nov. 26, 2012

(65) Prior Publication Data

US 2014/0146078 A1    May 29, 2014
US 2016/0071295 A9    Mar. 10, 2016

Related U.S. Application Data

(63) Continuation of application No. 13/677,937, filed on Nov. 15, 2012, now Pat. No. 9,183,649.

(51) Int. Cl.
| | |
|---|---|
| *G06T 11/20* | (2006.01) |
| *G06F 3/01* | (2006.01) |
| *G06T 11/00* | (2006.01) |
| *G06K 9/62* | (2006.01) |
| *G06K 9/00* | (2006.01) |

(52) U.S. Cl.
CPC .............. *G06T 11/206* (2013.01); *G06F 3/01* (2013.01); *G06K 9/00523* (2013.01); *G06K 9/6263* (2013.01); *G06T 11/00* (2013.01)

(58) Field of Classification Search
CPC .................................................. G06T 11/206
USPC ............................................................ 345/629
See application file for complete search history.

(56) References Cited

U.S. PATENT DOCUMENTS

| | | | |
|---|---|---|---|
| 5,912,656 A * | 6/1999 | Tham et al. | ........... 345/418 |
| 6,792,400 B2 | 9/2004 | Alden et al. | |
| 7,487,465 B2 * | 2/2009 | Haynes et al. | ........... 715/805 |

(Continued)

OTHER PUBLICATIONS

BM; "Method to enable visual feedback on virtual education"; http://www.ip.com/pubview/IPCOM000187377D; Sep. 3, 2009.

*Primary Examiner* — Devona Faulk
*Assistant Examiner* — Hai Tao Sun
(74) *Attorney, Agent, or Firm* — F. Chau & Associates, LLC

(57) ABSTRACT

A method for selecting an analysis procedure for a value series, including displaying a value series on a computer display monitor, receiving one or more sequences of user provided annotations, where the annotations overlay at least a sub-interval of the value series on the computer display monitor, using the sequences of user provided annotations to select an optimal value series analysis method from a set of value series analysis methods, where selecting an optimal value series analysis method includes determining parameter values for the optimal value series analysis method, and presenting the selected optimal value series analysis method and parameters, and the optimal reconstruction of the annotation sequences to the user.

9 Claims, 2 Drawing Sheets

(56) References Cited

U.S. PATENT DOCUMENTS

| | | | |
|---|---|---|---|
| 7,890,198 B1* | 2/2011 | Gahinet | 700/31 |
| 8,467,888 B2* | 6/2013 | Gahinet et al. | 700/30 |
| 2006/0190184 A1* | 8/2006 | Sasinowski et al. | 702/19 |
| 2006/0245641 A1* | 11/2006 | Viola et al. | 382/155 |
| 2008/0172212 A1* | 7/2008 | Gahinet et al. | 703/6 |
| 2008/0215546 A1* | 9/2008 | Baum et al. | 707/3 |
| 2011/0061501 A1 | 3/2011 | Jia | |
| 2012/0290879 A1* | 11/2012 | Shibuya et al. | 714/26 |

* cited by examiner

AUTOMATIC TUNING OF VALUE-SERIES ANALYSIS TASKS BASED ON VISUAL FEEDBACK

CROSS REFERENCE TO RELATED UNITED STATES APPLICATIONS

This application is a continuation of, and claims priority from, U.S. application Ser. No. 13/677,937, of Pompey, et al., filed on Nov. 15, 2012, in the United States Patent and Trademark Office.

BACKGROUND

1. Technical Field

This disclosure is directed to methods for preprocessing value series data, which encompasses time series data, for selecting an appropriate analysis method and tuning parameters.

2. Discussion of Related Art

Choosing the right analysis method and tuning its parameters appropriately is a prerequisite for making useful analytics applications. This is especially true for the analysis of time or value series. The tuning and selecting of the right analysis method on the one hand requires statistical expertise to understand the methods and their tuning process while on the other hand requires domain expertise to interpret the data and understand the task of interest. The statistical analysis is frequently difficult to understand and use for the domain expert while statisticians waste time acquiring the necessary domain expertise for solving the task of interest.

A typical example is the denoising of time series derived from sensor data. Such series can exhibit anything from random noise added to the actual signal to extreme values or complete sensor failure.

There are many methods known for filtering noise and removing outliers from data. Simple examples are smoothing algorithms based on moving averages, spline based methods, or filtering techniques such as low pass filters, etc.

There are challenges with these methods.

- Setting the parameters is a non-trivial task that usually requires a considerable amount of background knowledge, e.g., about the properties of the sensors. The choice of the best denoising method among a large number of diverse and highly tunable methods requires statistical expertise.
- The "right" filtering parameters may change over time, possible even frequently. A sensor could, for example, exhibit different properties by day and by night.
- The search space can be huge, which creates challenges from a point of view of computation complexity and statistical significance.

For these reasons, pre-processing large amounts of time series for analytics is still a very work intensive task that requires profound statistical knowledge about the properties of filters and the distribution of the original data.

Instead of this, an improved method would:

1. be simple enough to be used by an expert without too much statistical knowledge;
2. reduce the amount of interaction to a minimum; and
3. allow for a fine grained application of methods to a single or a set of series.

The current state of the art is to do this by a trial and error approach with the expert testing different methods and parameters to tune these methods to find the most suitable. This approach may, however, require much manual work and is prone to errors.

One alternative, if given a supervised learning task, is to use a wrapper with evolutionary computing to optimize the parameters for this task. As the search space for this optimization can be huge, these methods are likely to over-fit and have a high computational complexity. In addition, these methods are only applicable for supervised tasks. There are also methods of semi-supervised learning for clustering, which usually take pairs of entities and label them as similar or dissimilar. Based on this, optimal parameters and a distance metric can be learned. While these methods might work well for some data sets, they usually require many labeled pairs, and rely on good existing features, which are usually not available for value series. Furthermore, those methods are usually tuned for clustering and are not appropriate for analyzing value series. Most importantly, the interaction with the user is limited to labels given by the user, which restricts the interaction between the user and the analysis system.

BRIEF SUMMARY

According to an aspect of the invention, there is provided a computed-implemented method for selecting an analysis procedure for a value series, including displaying a value series on a computer display monitor, receiving one or more sequences of user provided annotations, where the annotations overlay at least a sub-interval of the value series on the computer display monitor, using the sequences of user provided annotations to select an optimal value series analysis method from a set of value series analysis methods, where selecting an optimal value series analysis method includes determining parameter values for the optimal value series analysis method, and presenting the selected optimal value series analysis method and parameters, and the optimal reconstruction of the annotation sequences to the user.

According to a further aspect of the invention, the method includes, after presenting the selected optimal value series analysis method to the user, receiving additional sequences of user provided annotations from the user, and selecting another optimal value series analysis method from a set of value series analysis methods that optimally reconstructs the sequences of user provided annotations.

According to a further aspect of the invention, the method includes displaying a plurality of value series on the computer display monitor, where at least one sequence of user provided annotations connects points in different value series.

According to a further aspect of the invention, the value series is a time series, and further comprising segmenting the time series into segments based on a sequence of user provided annotations.

According to a further aspect of the invention, selecting an optimal value series analysis method that optimally reconstructs the sequences of user provided annotations comprises, for segments that are annotated by the user, determining an optimal filter that minimizes an error between time series points in the segment and the user annotations.

According to a further aspect of the invention, selecting an optimal value series analysis method that optimally reconstructs the sequences of user provided annotations comprises, for segments that are not annotated by the user, identifying a similar annotated segment, and determining an optimal filter that minimizes an error between time series points in the unannotated segment and the annotated segment.

According to a further aspect of the invention, a similar annotated segment is identified based on a variance and frequency distribution of the unannotated segment and the annotated segment.

According to a further aspect of the invention, a similar annotated segment is identified based on an error distribution between the unannotated segment before and after being filtered by the optimal filter.

According to a further aspect of the invention, the method includes clustering all segments for which no similar annotated segment is identified into one or more clusters based on general characteristics of each segment, and presenting a representative of each cluster to the user for annotation.

According to a further aspect of the invention, the method includes extracting features that maximally correlate different sequences of user provided annotations.

According to a further aspect of the invention, the features include one or more of a lag value and a window width.

According to a further aspect of the invention, the optimal value series analysis method optimally reconstructs the user provided annotation sequences.

DETAILED DESCRIPTION

Figure 1:
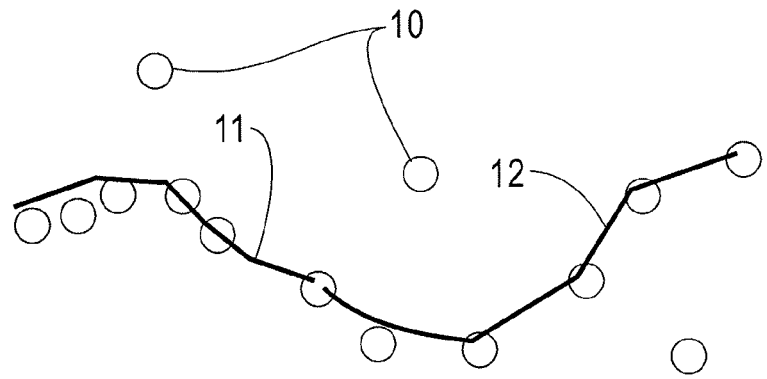
FIG. 1 depicts a plot of a value series with two groups of grouped values, according to an embodiment of the invention.

Exemplary embodiments of the invention as described herein generally include systems and methods for selecting a value series analysis method based on user provided annotations of one or more value series. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Embodiments of the present disclosure provide value series analysis systems that implement methods that allow a user to graphically annotate a time or value series and exploit these annotations to automatically tune a value series analysis task of interest. The annotations represent what the user, given his/her domain knowledge, regards as "information" as opposed to noise, outliers, random correlations or irrelevant patterns. The user provides feedback, in the form of value series, back to the analysis system. This type of feedback allows for new interaction schemes in both the way to ask the user about his/her expertise and retrieve the feedback and the way of using and exploiting the user's feedback to solve the task of interest.

Embodiments of the present disclosure allow users to graphically mark sub-segments of one or more value series that the user regards as relevant to a task of interest, in both the time and the value dimension. The task of interest can be anything from pure pre-processing and de-noising of a value series to forecasting, regression, pattern extraction, classification, feature extraction or definition of complex relationships, as long as the task concerns a value series or a set of value series. The user's feedback is then in the form of selected or sketched pieces of value series. These pieces of the value series usually deviate from the original value series. The feedback does not necessarily concern unique series values but can concern an arbitrary number of them. The user can for example define that two or more sub-segments across the same or different value series are related, thus that their mutual occurrence in time represents some valuable information.

Methods according to embodiments of the disclosure differ from marking intervals in time based on the original data, and from supervised learning. Annotations according to embodiments of the disclosure are not labels but rather highlight parts of the signal or relationships between parts of signals in a way that can differ from the original signal. Part of the signal refers to a segment on the time dimension but also to a decomposition on the value dimension.

Using an approach according to embodiments of the disclosure, a user has the best of both worlds: (1) making annotations is simple and intuitive; and (2) with a limited number of annotations, a whole series or a set of series can be automatically analyzed without having to manually define the procedure. The procedure selected by the analysis system is automatically tuned to reproduce the user's annotation on the rest of the value series it is given to process.

An approach according to embodiments of the disclosure allows a user to highlight information content in temporal data without labeling it. FIG. 1 depicts a plot of points 10 of a value series with two groups of grouped values, according to an embodiment of the invention. For clarity, only two points are indicated. Referring now to FIG. 1, a user would not need to express what the curves 11 and 12 exactly mean, a task that domain experts often find difficult. Still, this kind of feedback allows the analysis system to automatically derive a more sophisticated preprocessing procedure than would be possible to manually identify on the data alone.

Figure 2:
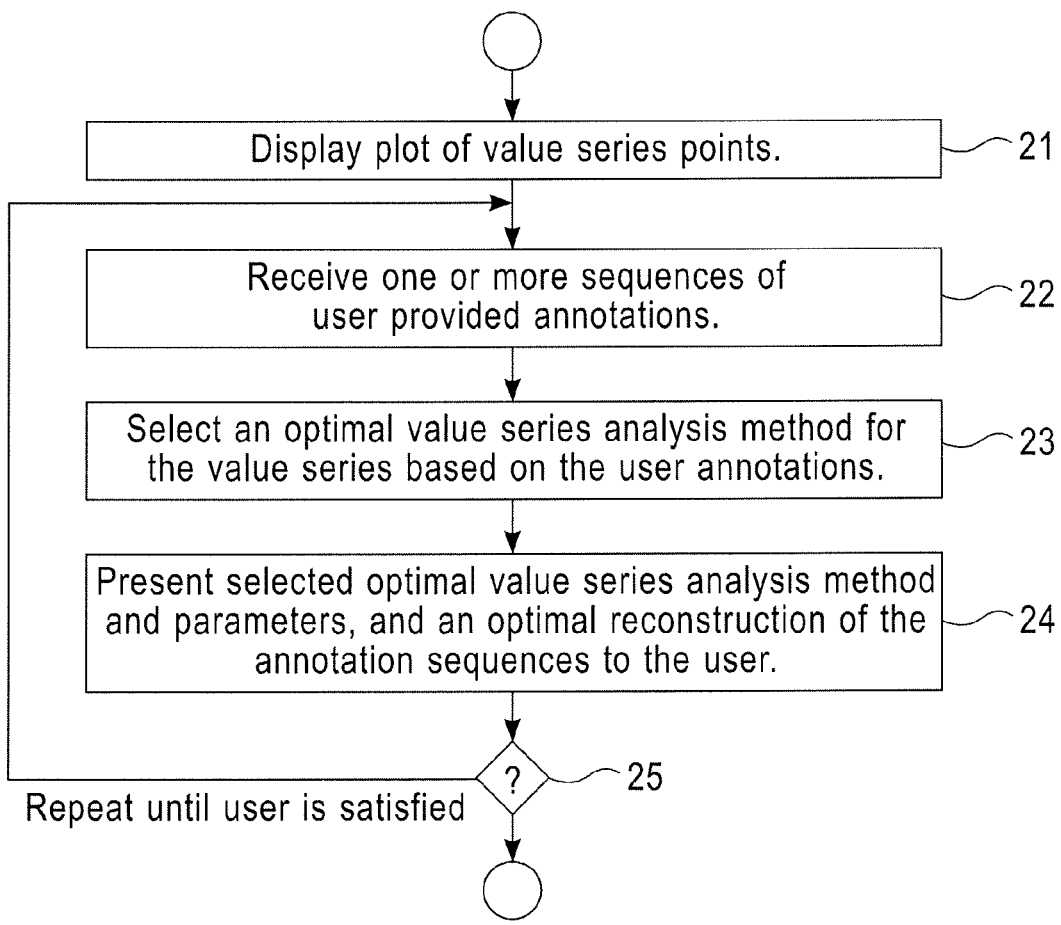
FIG. 2 is a flowchart of a method for selecting a value series analysis method based on user provided annotations of one or more value series, according to an embodiment of the invention.

FIG. 2 is a flowchart of a method for selecting a value series analysis method based on user provided annotations of one or more value series, according to an embodiment of the invention. Referring now to the figure, given one or more value series and sets of analysis methods for the value series, a method begins at step 21 by displaying on a computer display monitor a 2-dimensional (2D) plot of points of one or more value series. As shown in FIG. 1, the points can be represented by circles 10, however, this representation is exemplary and non-limiting, and other representations of the value series points, such as dots or polygons, are possible. At step 22, the user can mark arbitrarily many such parts of one or more series and then indicate that all marked parts of the series together constitute information content in the series related to its task of interest. Based on this, at step 23, the analysis system chooses from a set of tools for solving the task of interest an optimal processing tool for the series and, at step 24, presents it to the user for review. At step 25, the user can then decide to add additional annotations and start the process once again. The user feedback includes marking under the form of value series to tell the analysis system how the analysis should be performed. The analysis system then chooses, based on a set of tools for solving this task of interest, a best technique to use and how to tune this technique's parameters.

The computational aspect of a method according to an embodiment of the disclosure involves finding an optimal value series analysis method and tuning its parameters based on the user's feedback. The general idea is to find such value series analysis methods that optimally reconstruct what the user submitted as information annotations. How this is done, depends upon the value series analysis task of interest.

Two tasks of interest according to embodiments of the disclosure in which this extraction of information from signals could be used include Interactive De-noising and Assisted Feature Extraction. It is to be understood that an annotation and tuning method according to embodiments of the disclosure are general and can be applied to virtually any value-series analysis task. The two following examples are therefore exemplary and non-limiting embodiments of the disclosure.

Interactive De-Noising:

In an interactive de-noising according to an embodiment of the disclosure, a domain expert user first graphically tags the signal in a part of the time series. Based on this annotation, the complete time series is segmented over time.

The initial segmentation itself can be determined based on seasonality, user input or a general purpose time series segmentation algorithm. For each of the segments that are completely annotated, optimal filtering criteria are determined, i.e., filters that would lead to a minimal error between the measured signal and the user annotation.

For each of the non-annotated segments a similar annotated segment is identified by similarity search. The similarity could be based on two possible sets of features: (1) general characteristics of the segment, such as variance or frequency distribution; and (2) the error distribution between the raw and the filtered signal. Based on this similarity, the most similar segment is chosen and the filtering method used on this segment is applied to the non-annotated segment.

An approach according to embodiments of the disclosure allows graphical filtering of time series, so that expert users without further statistical knowledge can easily perform it. The burden of selecting the right filtering technique and optimizing its parameters is fully taken over by the analysis system on the basis of the user's annotations. An optimal filtering criteria could be local, thus the same filter would not apply to the whole series but different criteria could be applied to different parts of the series. On the other hand, reoccurring or similar segments need only be annotated once. This optimization is sound, as it uses the error distribution as a criterion to decide whether two segments are sufficiently close to each other.

Assisted Feature Extraction:

One of the most challenging tasks in time series analysis is to identify good features that predict future values of a series. Such features could be past windows or trends of the current series or other series, seasonal features, etc. Identifying features is challenging, especially if only limited data is given. Information by the user that would give hints to the analysis system, as of which series can be related, is therefore useful for successful feature extraction.

On the other hand, it is challenging for users to just state exactly which features are relevant. Embodiments of the disclosure provide a method for a user to annotate pairs of signal segments, in the sense above, in one or more series that would be related.

Figure 3:
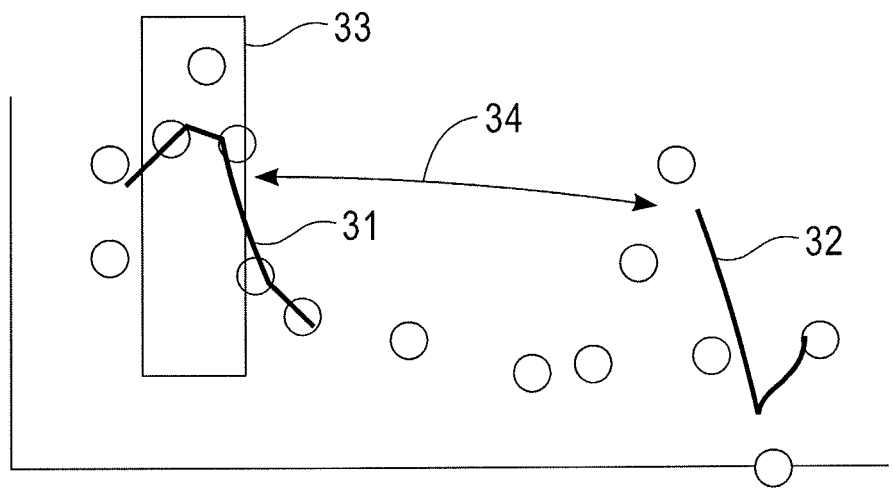
FIG. 3 is a plot depicting the derivation of features from selected value series points, according to an embodiment of the invention.

Based on these relations, features can be extracted that would maximally correlate both. FIG. 3 is a plot depicting the derivation of features from selected value series points, according to an embodiment of the invention. For example, referring now to FIG. 3, features could be used to learn a lag value 34 from the distance between the two annotations 31, 32 and a window width 33 from the difference of the annotated first signal 31 and the original first signal. Note that for feature extraction, one would usually not have to apply the filter to the second member of the pair, as this represents the forecasted value.

Interactive Forecasting and Regression:

Most time-series forecasting algorithms cope very well with time-series that are stationary, meaning their behavior is stable over time. However, detecting and handling potentially reoccurring unusual behaviors that break this stationary assumption is challenging and usually has negative consequences on the quality of a forecasting algorithm. Values series annotations can be used to annotate such unusual behaviors and their consequences on other part of the value series. The method enabling this would be similar to the one presented for assisted feature extraction.

Another application for forecasting and regression is in the spirit of the example on interactive denoising: most of the time, choosing the right forecasting algorithm and tuning its parameter is challenging. Methods according to embodiments presented in the denoising example can be used to appropriately select and tune a forecasting algorithm to a given value series.

Interactive Classification:

Value series annotations can be used in the context of classification by asking the user to select some segments of a time series and classify them manually. Then, similar to the denoising example, the full time series can be segmented using, for example, one of the following techniques: seasonality, user input or a general purpose time series segmentation algorithm. For each non-annotated segment, similarly to the feature extraction example, a similarity measure can be used to detect the most similar annotated segment and this non-annotated segment is attributed the class of its most similar segment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
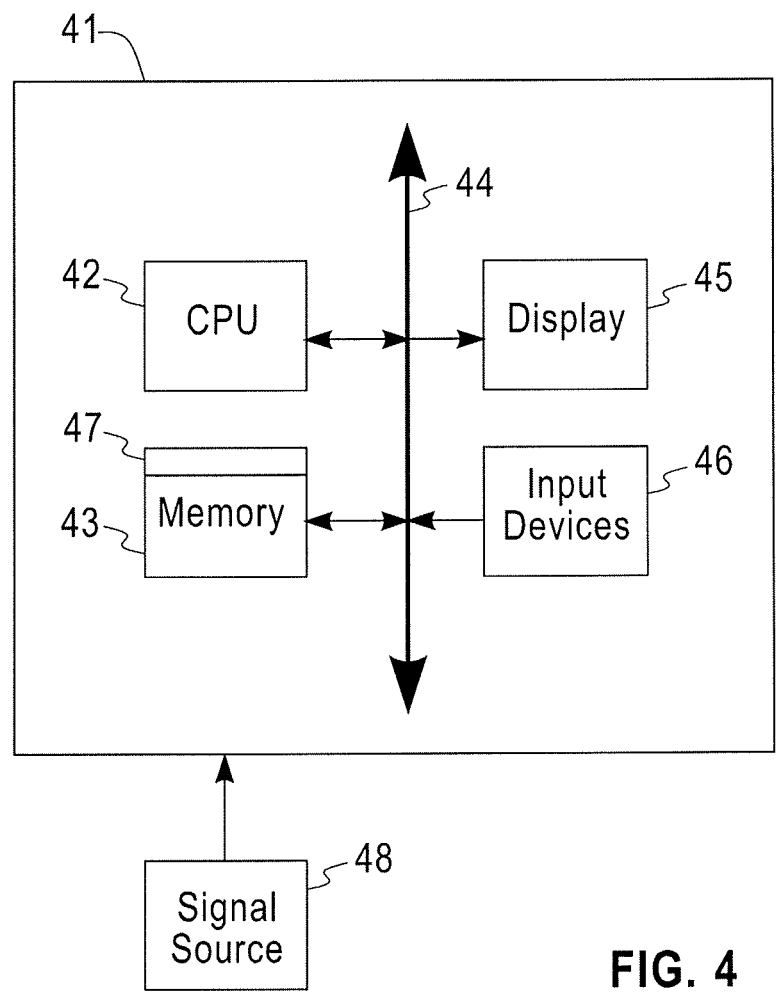
FIG. 4 is a block diagram of an exemplary computer system for implementing a method for selecting a value series analysis method based on user provided annotations of one or more value series, according to an embodiment of the invention.

FIG. 4 is a block diagram of an exemplary computer system for implementing a system for selecting a value series analysis method based on user provided annotations of one or more value series. Referring now to FIG. 4, a computer system 41 for implementing the present invention can comprise, inter alfa, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A non-transitory program storage device readable by a computer, tangibly embodying a program of instructions executed by the computer to perform the method steps for selecting an analysis procedure for a time series, the method comprising the steps of:

displaying a time series on a computer display monitor;

receiving one or more sequences of user provided annotations, wherein said annotations overlay at least a sub-interval of said time series on said computer display monitor;

using said sequences of user provided annotations to select an optimal time series analysis method from a set of time series analysis methods, wherein selecting an optimal time series analysis method includes determining parameter values for said optimal time series analysis method;

segmenting said time series into segments based on a sequence of user provided annotations; and presenting said selected optimal time series analysis method and parameters, and said optimal reconstruction of said annotation sequences to the user, wherein selecting an optimal time series analysis method that optimally reconstructs said sequences of user provided annotations comprises, for segments that are not annotated by the user, identifying a similar annotated segment, and determining an optimal filter that minimizes an error between time series points in the unannotated segment and the annotated segment, wherein a similar annotated segment is identified based on an error distribution between the unannotated segment before and after being filtered by said optimal filter.

2. The computer readable program storage device of claim 1, the method further comprising, after presenting said selected optimal time series analysis method to the user, receiving additional sequences of user provided annotations from the user, and selecting another optimal time series analysis method from a set of time series analysis methods that optimally reconstructs said sequences of user provided annotations.

3. The computer readable program storage device of claim 1, the method further comprising displaying a plurality of time series on said computer display monitor, wherein at least one sequence of user provided annotations connects points in different time series.

4. The computer readable program storage device of claim 1, wherein selecting an optimal time series analysis method that optimally reconstructs said sequences of user provided annotations comprises, for segments that are annotated by the user, determining an optimal filter that minimizes an error between time series points in the segment and the user annotations.

5. The computer readable program storage device of claim 1, wherein a similar annotated segment is identified based on a variance and frequency distribution of the unannotated segment and the annotated segment.

6. The computer readable program storage device of claim 1, the method further comprising clustering all segments for which no similar annotated segment is identified into one or more clusters based on general characteristics of each segment, and presenting a representative of each cluster to the user for annotation.

7. The computer readable program storage device of claim 1, the method further comprising extracting features that maximally correlate different sequences of user provided annotations.

8. The computer readable program storage device of claim 7, wherein said features include one or more of a lag value and a window width.

9. The computer readable program storage device of claim 1, wherein said optimal time series analysis method optimally reconstructs the user provided annotation sequences.

\* \* \* \* \*